(12) United States Patent
Carlie

(10) Patent No.: US 10,294,143 B2
(45) Date of Patent: May 21, 2019

(54) GLASSES FOR THE CORRECTION OF CHROMATIC AND THERMAL OPTICAL ABERATIONS FOR LENSES TRANSMITTING IN THE NEAR, MID, AND FAR-INFRARED SPECTRUMS

(71) Applicant: Schott Corporation, Elmsford, NY (US)

(72) Inventor: Nathan Aaron Carlie, Clarks Summit, PA (US)

(73) Assignee: SCHOTT CORPORATION, Elmsford ( * ) Notice: Subject to any disclaimer, the term of this patent is extended or adjusted under 35 U.S.C. 154(b) by 0 days.

(21) Appl. No.: 14/937,230

(22) Filed: Nov. 10, 2015

(65) Prior Publication Data

US 2016/0168015 A1    Jun. 16, 2016

Related U.S. Application Data

(62) Division of application No. 13/452,271, filed on Apr. 20, 2012, now Pat. No. 9,187,360.

(51) Int. Cl.
   *C03C 3/32*    (2006.01)
   *G02B 13/14*   (2006.01)
   (Continued)

(52) U.S. Cl.
   CPC ............... *C03C 3/323* (2013.01); *C03C 3/32* (2013.01); *C03C 3/321* (2013.01); *C03C 4/10* (2013.01);
   (Continued)

(58) Field of Classification Search
   CPC ................................ C03C 3/321; C03C 3/323
   (Continued)

(56) References Cited

U.S. PATENT DOCUMENTS

| 4,027,159 A | 5/1977 | Bishop |
| 4,492,763 A | 1/1985 | Trotta et al. |

(Continued)

FOREIGN PATENT DOCUMENTS

| JP | H02275732 A | 11/1990 |
| JP | H04342438 A | 11/1992 |

(Continued)

OTHER PUBLICATIONS

Guignard et al. Chalcogenide Glasses Based on Germanium Disulfide for Second Harmonic Generation.Adv. Funct. Mater. 2007, 17, 3284-3294.*

(Continued)

*Primary Examiner* — Noah S Wiese
(74) *Attorney, Agent, or Firm* — Millen White Zelano & Branigan, PC

(57) ABSTRACT

The invention relates to chalcogenide glass compositions for use in a lens system to balance thermal effects and chromatic effects and thereby provide an achromatic and athermal optical element that efficiently maintains achromatic performance across a broad temperature range. The glass composition is based on sulfur compounded with germanium, arsenic and/or gallium, and may further comprise halides of, for example, silver, zinc, or alkali metals. Alternatively, is based on selenium compounded with gallium, and preferably germanium, and contains chlorides and/or bromides of, for example, zinc, lead or alkali metals.

34 Claims, 2 Drawing Sheets

(51) Int. Cl.
*C03C 4/10* (2006.01)
*G01J 5/08* (2006.01)
*G02B 27/00* (2006.01)
*G01J 5/00* (2006.01)

(52) U.S. Cl.
CPC ............ *G01J 5/0806* (2013.01); *G02B 13/14* (2013.01); *G02B 13/146* (2013.01); *G02B 27/0025* (2013.01); *G01J 2005/0077* (2013.01)

(58) Field of Classification Search
USPC .......................................................... 501/40
See application file for complete search history.

(56) References Cited

U.S. PATENT DOCUMENTS

| | | | |
|---|---|---|---|
| 4,612,294 A | 9/1986 | Katsuyama | |
| 4,653,879 A * | 3/1987 | Filipovich | G02B 23/125 250/330 |
| 4,695,119 A | 9/1987 | Neil | |
| 4,704,371 A | 11/1987 | Krolla | |
| 4,712,886 A | 12/1987 | Mercado | |
| 4,942,144 A | 7/1990 | Martin | |
| 4,989,962 A * | 2/1991 | Kebo | G02B 1/02 359/354 |
| 5,044,706 A | 9/1991 | Chen | |
| 5,202,792 A | 4/1993 | Rollin | |
| 5,240,885 A | 8/1993 | Aitken | |
| 5,315,434 A | 5/1994 | Mizuno et al. | |
| 5,389,584 A | 2/1995 | Aitken et al. | |
| 5,392,376 A * | 2/1995 | Aitken | C03C 3/321 385/142 |
| 5,737,120 A | 4/1998 | Arriola | |
| 5,846,889 A | 12/1998 | Harbison | |
| 5,973,827 A | 10/1999 | Chipper | |
| RE36,513 E | 1/2000 | Aitken et al. | |
| 6,128,429 A | 10/2000 | Cole | |
| 6,134,039 A | 10/2000 | Rudeen | |
| 6,148,125 A | 11/2000 | Heo Jong | |
| 6,262,844 B1 | 7/2001 | Soskind | |
| 6,292,293 B1 | 9/2001 | Chipper | |
| 6,323,487 B1 | 11/2001 | Wu | |
| 6,462,874 B1 | 10/2002 | Soskind | |
| 6,473,232 B2 | 10/2002 | Ogawa | |
| 6,503,859 B1 | 1/2003 | Aitken | |
| 6,545,826 B2 | 4/2003 | Horwitz et al. | |
| 6,756,333 B2 | 6/2004 | Aitken | |
| 6,791,754 B2 | 9/2004 | Ogawa | |
| 6,825,979 B2 | 11/2004 | Ogawa | |
| 6,865,318 B1 | 3/2005 | Hayden et al. | |
| 6,999,238 B2 | 2/2006 | Glebov et al. | |
| 6,999,243 B2 * | 2/2006 | Chipper | G02B 15/14 359/354 |
| 7,038,853 B2 | 5/2006 | Li et al. | |
| 7,072,117 B2 | 7/2006 | Glebov et al. | |
| 7,095,929 B2 | 8/2006 | Nowak | |
| 7,116,888 B1 * | 10/2006 | Aitken | C03C 3/321 385/141 |
| 7,330,634 B2 | 2/2008 | Aitken | |
| 7,672,045 B2 | 3/2010 | Baker | |
| 7,767,604 B2 | 8/2010 | Aitken | |
| 7,835,071 B2 | 11/2010 | Izumi | |
| 7,848,015 B2 | 12/2010 | Baker | |
| 2003/0104918 A1 | 6/2003 | Aitken | |
| 2006/0233512 A1 | 10/2006 | Aitken et al. | |
| 2006/0257097 A1 | 11/2006 | Aitken | |
| 2009/0067040 A1 | 3/2009 | Izumi | |
| 2009/0270241 A1 | 10/2009 | Aitken | |

FOREIGN PATENT DOCUMENTS

| | | |
|---|---|---|
| JP | H054835 A | 1/1993 |
| JP | H0524879 | 2/1993 |
| JP | H0585769 A | 4/1993 |
| JP | 06-027368 A | 2/1994 |
| JP | H0627368 A | 2/1994 |
| JP | H07101749 A | 4/1995 |
| JP | H08325032 A | 12/1996 |
| JP | H09110461 A | 4/1997 |
| JP | 04-342438 B2 | 10/2009 |
| WO | 9928256 A | 6/1999 |

OTHER PUBLICATIONS

European Search Report corresponding to EP 13 77 8981, dated May 18, 2016.
Gao Tang et al., "Preparation and properties of GeSe2—Ga2Se3—KBr new chalcohalide glasses", Journal of Alloys and Compounds, vol. 459, (2008), pp. 472-476.
Zhiyong Yang et al., "Visible Transparent GeSe2—Ga2Se3—KX (X = I, Br, or Cl) Glasses for Infrared Optics", J. Am. Ceram. Soc., vol. 90, No. 2, (2007), pp. 667-669.
V. Vassilev et al., "New chalcogenide glasses in the GeSe2—Sb2Se3—PbSe system", Materials Chemistry and Physics, vol. 103, (2007), pp. 312-317.
K. Petkov et al., "Optical properties of thin films from new chalcogenide GeSe2—Sb2—Se3—PbTe glasses", Journal of Optoelectronics and Advance Materials, vol. 13, No. 11-12, (Nov.-Dec. 2011), pp. 1514-1518.
T.H. Jamieson, "Athermalization of Optical Instruments from the Optomechanical Viewpoint", Critical Review, vol. CR43 (Jul. 1992) pp. 131-159.
PCT International Preliminary Report on Patentability and Written Opinion of the International Searching Authority. International Application No. PCT/US2013/037395. International Filing Date: Apr. 19, 2013. Publication No. WO2013/159009. Date of Issuance of Report: Oct. 21, 2014.
Webber, P.J. et al.; Journal of Non-Crystalline Solids 20 (1976) 271-283.
Vogel, W.; Chemistry of Glass; Table 8.6; p. 786-187 (1985) Editor: N. Kriedl.
Myers, M. et al.; Journal of Non-Crystalline Solids 8-10 (1972) 804-815.
English translation of Search Report and Office Action in corresponding JP Pat. Appl. No. 2015-507223 dated Dec. 20, 2016.
Partial English translation of JP Patent Appl. Publ. No. H02-275732 published onNov. 9, 1990.
Partial English translation of JP Patent Appl. Publ. No. H05-24879 published on Feb. 2, 1993.
Partial English translation of JP Patent Appl. Publ. No. H05-4835 published onJan. 14, 1993.
Partial English translation of JP Patent Appl. Publ. No. H09-110461 published on Apr. 28, 1997.
Machine english translation of WO1999028256A1 published Jun. 10, 1999.
English abstract of JPH5085769A published Apr. 6, 1993 to Hoya.
English abstract of JPH08325032 published Dec. 10, 1996 to Hoya.
English abstract of JPH7101749A published Apr. 18, 1995 to Nippon Telegraph & Telephone.
Office Action in corresponding Israel application 234939 dated Jun. 26, 2017.
Office Action in corresponding JP application 2015-507223 dated Oct. 23, 2017.
Gan Fuix, New Glass-Forming Systems and Their Practical Application, Journal of Non-Crystalline Solids, NL, Elsevier B.V., Aug. 2, 1990, vol. 123, Issues 1-3, pp. 385-399.
Ledemi Y, Influence of Ga incorporation on Photoinduced phenomena in Ge—S based glasses, Journal of Non-Crystalline Solids, NL, Elsevier B.V., Jul. 23, 2009, vol. 355, Issues 37-42, pp. 1884-1889, DOI:10.1016/j.inoncrysol.2009.04.046.
R. Todorov et al., Light-induced changes in the optical properties of thin films of Ge—S—Bi(Ti, In) chalcogenides, Journal of Non-Crystalline Solids, NL, Elsevier B.V., Oct. 1, 2003, vols. 326-327, pp. 263-267.
Z. Boncheva-Mladenova et al., A Study of Glass Phases of the Germanium-Sulphur-Indium System, Journal of Non-Crystalline

(56) References Cited

OTHER PUBLICATIONS

Solids, NL, Elsevier B.V., Nov. 1978, vol. 30, Issue 2, pp. 147-153, DOI:10.1016/0022-3093(78)90063-7.
Office Action in corresponding Israel Application No. 234939 (and English summary thereof) dispatched May 8, 2018.
Translation of Decision of Refusal in corresponding JP Pat. Appl. No. 2015-507223 dispatched May 21, 2018.
K. Abe et al., Preparation and properties of Ge—Ga—S glasses for laser hosts, Journal of Non-Crystalline Solids, NL, Elsevier B.V., Jul. 1, 1997, vol. 212, Issues 2-3, pp. 143-150, ISSN:0022-3093.
P. Loeffler et al., Structural changes of GeGaS bulk glasses induced by UV exposure, Journal of Non-Crystalline Solids, NL, Elsevier B.V., Jul. 11, 1998, vols. 232-234, pp. 526-531, ISSN:0022-3093.
Translation of Decision of Dismissal of Amendment in corresponding JP Pat. Appl. No. 2015-507223 dispatched May 21, 2018.
Supplementary Partial European Search Report corresponding to EP 13 77 8981, dated Dec. 15, 2015.

* cited by examiner

GLASSES FOR THE CORRECTION OF CHROMATIC AND THERMAL OPTICAL ABERATIONS FOR LENSES TRANSMITTING IN THE NEAR, MID, AND FAR-INFRARED SPECTRUMS

SUMMARY OF THE INVENTION

The invention relates to glass compositions that can be used for manufacturing optical lens that correct for optical aberrations, particularly chromatic aberrations and aberrations due to thermal effects, of lens that transmit light in the near-, mid- and/or far-range infrared spectrum, and preferably also within at least a portion of the visible spectrum.

Infrared lens transmit light in near-infrared range (e.g., 700 nm to 1.8 μm), the mid-infrared range (e.g., 3.0-5.0 μm) and/or the far-infrared range (e.g., 8.0-13.0 μm). Often IR lenses are characterized as transmitting light in the SWIR, MWIR, or LWIR regions, i.e., the short-wave (SWIR) region (wavelengths of 1-3 μm), mid-wave (MWIR) region (wavelengths of 3-5 μm), and the long-wave (LWIR) region (wavelengths of 8-12 μm). Infrared lens are used in a wide variety of applications including low-light level (night vision) imagers such as night vision goggles, thermal imagers, and systems capable of seeing through obscurants such as fog, smoke and dust.

Night vision devices such as night vision goggles generally rely on low-level reflected light in the visible and near-infrared range. These devices utilize image enhancers that collect the visible and infrared light passing through the lens and amplify the light to produce a visible image. In general, night vision goggles comprise an infrared objective lens which transmits light in the visible and near-infrared range, an image enhancer or intensifier that amplifies the photons and converts them to electrons, and a phosphor or fluorescent display that receives the electrons and produces an amplified image. See, for example, Filipovich (U.S. Pat. No. 4,653,879).

Thermal imagers utilize emitted, rather than reflected, infrared light, specifically emitted thermal energy. Therefore, thermal imagers generally operate in the mid-infrared s and/or the far-infrared ranges. Humans, animals, and operating machines, for example, produce their own heat which is emitted as infrared radiation. Other objects rocks and buildings absorb heat from the sun, for example, and then radiate that heat as infrared light. Thus, thermal imagers have many civilian and military applications for purposes of surveillance, security and safety, such as imaging people and vehicles, determining hot spots, and monitoring industrial machinery and processing plants.

In general, an infrared or thermal imaging system comprises optics including an IR lens for collecting and focusing transmitted infrared light and a plurality of thermal sensors for detecting the infrared light and converting it into electrical signals, and a signal-processing unit for converting the electrical signals into a visual image. See, for example, Izumi (U.S. Pat. No. 7,835,071).

Optical lens including infrared lens are susceptible to several optical aberrations. For example, most imaging systems need to bring light of many wavelengths to a focus at the same distance from the lens. However, the refractive index of all known materials varies as a function of the wavelength. This variation in refractive index, known as dispersion, produces an aberration known as chromatic aberration, sometimes referred to as "color fringing."

There are two types of chromatic aberration. Longitudinal chromatic aberration or axial chromatic aberration results when the different wavelengths transmitted by the lens have different focal lengths, since the focal length of a lens varies as a function of its refractive index. As a result, the wavelengths do not focus on the same focal plane. So, for example, the focal distance of blue light will be shorter than the focal distance for red light.

Lateral chromatic aberration occurs when the different wavelengths are magnified differently by the lens. As a result, the wavelengths will focus at different positions along the same focal plane.

One approach to overcoming chromatic aberration is to use multiple lenses to counter-act the influence of refractive index dispersion on the image. An achromat lens or achromatic doublet is made by combining two different lens materials that have different dispersion properties. The achromat lens functions to bring two different wavelengths both into focus on the same focal plane, thereby reducing chromatic aberration.

Apochromatic lenses involve multiple materials and are designed to bring three or more wavelengths into focus in the same plane. Such lenses provide better correction of chromatic aberration and also alleviate spherical aberration (i.e., an aberration that occurs when light passing through a lens is refracted more at the lens's edge than at its center). Thus, the use of such doublet or triplet (or greater) lenses may alleviate the phenomenon of chromatic aberration and thereby improve color rendering of an optical system.

For lenses that transmit primarily in visible spectrum, the use of doublet or triplet lenses is common practice. One can select two, or in many cases three or even more, materials from a wide range of available glass types, and tune the lens design to the desired optical performance. However, the design of such multiple lens arrangements is more difficult for infrared lenses. The number of optical materials that are transparent in the mid- and far-infrared range is very limited. Such design is even more complicated when transparency in the visible (400 nm to 800 nm) or near-infrared (700 nm to 1.8 μm) is required simultaneously with and mid-infrared (3.0-5.0 μm) and/or far-infrared (8.0-13.0 μm) transmission.

In addition to dispersion, most infrared-transparent materials suffer from a large temperature dependence of the refractive index and from large coefficients of thermal expansion. Both of these factors induce changes in the focal length of a lens as the temperature changes, leading to thermal defocusing. Thus, in addition to addressing the problem of chromatic aberration by providing achromatic infrared lens systems, it is also desirable to provide athermal infrared lens systems in which the optical performance is stabilized with respect to variations in temperature.

For a description of prior art attempt to achieve athermalization of IR lens systems, see, for example, Jamieson, T. H., Athermalization of Optical Instruments from the Optomechanical Viewpoint, *Proc. SPIE*, CR43, 131 (1992).

In addition, Arriola (U.S. Pat. No. 5,737,120) discloses an achromatic and athermal two element objective lens that transmits in the long wave infrared (LWIR) spectral region (8-12 μm). One lens element of the objective lens is made of zinc selenide (ZnSe) and has a positive optical power. The other lens element is made of germanium (Ge) and has a negative optical power. The positive lens element has a lower thermo-optic coefficient (lower dn/dT) than the negative lens. This difference in thermo-optic coefficient provides for athermalization of the lens system, but not color correction. To provide color correction, Arriola attaches a diffractive optical surface on one surface of either lens element.

From an optical perspective, the halides (F, Cl, Br and I) of silver (Ag), thallium (Tl), and the alkali metals (Na, K, Rb and Cs) are attractive materials for attempting to fulfill the requirements of an achromatic and athermal compound IR lens. However, these materials suffer from extremely low mechanical durability, high toxicity, and, in the case of the alkali metals, extreme sensitivity to moisture. Therefore, the use of these materials is commonly seen as impractical.

Other polycrystalline materials that could possibly satisfy the desired criteria include polycrystalline compounds of alkaline earth elements (Ca, Sr, Ba) with fluorine and compounds of zinc (Zn) with group IV "chalcogenide" elements (S, Se). These materials are known to have sufficient chemical and mechanical durability. However, the combination of their particular refractive indices and dispersions are not suitable for practical achromatic optics. Moreover, the fluorides tend to lack sufficient transmission at wavelengths beyond 10 μm. Intrinsic semiconductor materials composed of Group IV elements (Si and Ge) or compounds of group III and group V elements such as GaAs and InSb do not simultaneously offer sufficient mid/far-IR and visible/near-IR transparency.

Since the chemical composition of crystalline compounds is fixed, it is not possible to tune their properties to allow achromatic performance in a two-element lens system through varying the composition. On the other hand, glasses which offer both infrared and visible transparency might, by compositional tailoring, be used to balance the chromatic effects of other glasses or crystalline materials in a compound IR lens. However, to date no glasses are available that have properties tuned to satisfy the requirements of achromatic and athermal optical element for broadband optics. It is possible to achieve achromatic and athermal performance using a large number of crystalline compounds, often using greater than 5 individual optical elements. But, such designs are costly due to added mechanical complexity and the need for many specially designed anti-reflection coatings, or such designs have poor performance due to large reflection losses at the various interfaces. Additionally, most of the available crystalline materials, such as KBr or KRS5 (thallium bromo-iodide; TlBr—TlI) suffer poor mechanical and chemical stability and may be highly toxic.

Therefore, an aspect of the invention is to provide glass compositions, in particular chalcogenide glass compositions, for use in a lens system that simultaneously balances both the thermal effects and chromatic effects of multiple lenses within a compound optical element to achieve an infrared optical system that will efficiently maintain achromatic performance across a broad temperature range, and preferably is suitable for use in broadband optics.

Upon further study of the specification and appended claims, further aspects and advantages of this invention will become apparent to those skilled in the art.

According to one aspect of the invention, there is provided a glass composition based on sulfur compounded with germanium, arsenic and/or gallium that may further comprise halides of silver, copper ($Cu^{+1}$), cadmium, zinc, lead ($Pb^{+2}$), alkali metals, alkaline earth metals, or rare earth metals, wherein the glass composition transmits near-, mid-, and/or far-infrared light. The glass system based on sulfur compounded with germanium, arsenic and/or gallium provides compositions with relatively low refractive indices. Moreover, these glass compositions exhibit relatively low refractive index dispersion in the mid-infrared range, although the refractive index dispersion in the near- and far-infrared can be high. The optional halides provide the ability to not only enhance infrared transparency of the glass, but also aid in controlling refractive index dispersion and thermal expansion.

According to a further aspect of the invention, there is provided a chalcogenide glass composition based on sulfur compounded with germanium, arsenic and/or gallium, comprising (based on mol %):

| Component | Mole % |
|---|---|
| S | 58.00-90.00 |
| Ga | 0-25.00 |
| As | 0-40.0 |
| Ge | 0-35.00 |
| $R^1$ (added in the form of $R^1$Hal) | 0-7.25 |
| $R^2$ (added in the form of $R^2$Hal) | 0-13.5 |
| $M^1$ (added in the form of $M^1Hal_2$) | 0-5 |
| $M^2$ (added in the form of $M^2Hal_2$) | 0-7.25 |
| Ln (added in the form of $LnHal_3$) | 0-4 |
| Sum of Ga, As, and Ge | 10.00-42.00 |
| Sum of $R^1$, $R^2$, $M^1$, $M^2$, and Ln | 0-16.00 |
| Sum of Hal | 0-16.00 | wherein

Hal=fluoride, chloride, bromide, and/or iodide, $R^1$=Li, Na, K, Rb, and/or Cs, $R^2$=Ag and/or Cu, $M^1$=Mg, Ca, Sr, and/or Ba, $M^2$=Zn, Cd, Hg, and/or Pb, Ln=La, Ce, Pr, Nd, Pm, Sm Eu, Gd, Tb, Dy, Ho, Er, Tm, Ty, Lu, Y, and Sc; and wherein a portion of the gallium can be replaced by indium, and a portion of the arsenic can be replaced by antimony.

The glass system based on sulfur compounded with germanium, arsenic and/or gallium, at a thickness of 10 mm, preferably transmits at least 75% of incident light at wavelengths from 500 nm to 11000 nm, especially at least 70% of incident at wavelengths from 650 nm to 12000 nm, and particularly at least 70% of incident at wavelengths from 500 nm 14000 nm.

The glass system based on sulfur compounded with germanium, arsenic and/or gallium also preferably exhibits an extinction coefficient of <0.1 $cm^{-1}$ at wavelengths from 500 nm to 11000 nm, especially at wavelengths from 650 nm to 12000 nm, and particularly at wavelengths from 500 nm 14000 nm.

According to another aspect of the invention, there is provided a glass composition based on selenium compounded with gallium, and containing a large of chlorides and/or bromides of silver, copper ($Cu^{+1}$), cadmium, zinc, mercury, lead ($Pb^{+2}$), alkali metals, alkaline earth metals, or rare earth metals, wherein the glass composition transmits near-, mid-, and/or far-infrared light. These glasses offer enhanced infrared transmission, and lower far-infrared dispersion, but require significantly higher additions of halides to achieve high visible transmission.

According to a further aspect of the invention, there is provided a chalcogenide glass composition based on selenium compounded with gallium and optionally germanium, comprising (based on mol %):

| Component | Mole % |
|---|---|
| Se | 30.00-68.00 |
| Ga | 5.00-30.00 |
| Ge | 0-25.00 |
| $R^1$ (added in the form of $R^1Hal^1$) | 0-25.00 |
| $R^2$ (added in the form of $R^2Hal^1$) | 0-25.00 |
| $M^1$ (added in the form of $M^1Hal^1_2$) | 0-12.50 |
| $M^2$ (added in the form of $M^2Hal^1_2$) | 0-20.00 |
| Ln (added in the form of $LnHal^1_3$) | 0-8.00 |
| Sum of Se, Ga, and Ge | 50.00-93.33 |
| Sum of $R^1$, $R^2$, $M^1$, $M^2$, and Ln | 1.67-25.00 |
| Sum of $Hal^1$ | 5.00-25.00 | wherein
$Hal^1$=chloride and/or bromide,
$R^1$=Li, Na, K, Rb, and/or Cs,
$R^2$=Ag and/or Cu,
$M^1$=Mg, Ca, Sr, and/or Ba,
$M^2$=Zn, Cd, Hg, and/or Pb,
Ln=La, Ce, Pr, Nd, Pm, Sm Eu, Gd, Tb, Dy, Ho, Er, Tm, Ty, Lu, Y, and Sc; and
wherein a portion of the gallium can be replaced by indium.

The glass system based on selenium compounded with gallium, and containing a chlorides and/or bromides, at a thickness of 10 mm, preferably transmits at least 75% of incident light at wavelengths from 500 nm to 11000 nm, especially at least 70% of incident at wavelengths from 650 nm to 12000 nm, and particularly at least 70% of incident at wavelengths from 500 nm 14000 nm.

The glass system based on selenium compounded with gallium, and containing a chlorides and/or bromides also preferably exhibits an extinction coefficient of <0.1 cm$^{-1}$ at wavelengths from 500 nm to 11000 nm, especially at wavelengths from 650 nm to 12000 nm, and particularly at wavelengths from 500 nm 14000 nm.

For both the sulfur based compositions and the selenium based compositions, the properties of most interest, in addition to good chemical and mechanical durability and desired light transmission, are index dispersion, coefficient of thermal expansion, and thermal dependency of refractive index.

The index dispersion is preferably as low as possible. The amount of index dispersion is measured as the Abbe number in the visible, $V_d$, which is calculated as $V_d=(n_d-1)/(n_F-n_c)$ where $n_d$, $n_F$ and $n_c$ are the refractive indices of the material at the d line, F line, and C line (F line: 486.13 nm, d line: 587.56 nm, C line: 656.27 nm). Abbe number in the mid-IR range (3-5 μm) is generally calculated using the index at 3000, 4000, and 5000 nm while the Abbe number in the long-wave range (8-12 μm) may be calculated using the index at 8000, 10,000 and 12,000 nm.

In general, the higher the Abbe No. the lower index dispersion. The glass compositions according to the invention preferably exhibit an Abbe No. in the visible range of at least 15, for example, 20-30, especially greater than 25. In the mid-infrared range the glasses preferably exhibit an Abbe No. of at least 100, for example, 100-300, especially at least 180, particularly greater than 200. In the far-infrared range the glasses preferably exhibit an Abbe No. of at least 60, for example, 60-185, especially at least 100, particularly greater than 120.

Similarly, the coefficient of thermal expansion, a, is preferred to be as low as possible for the glass compositions according to the invention. Thus, the glasses according to the invention preferably have a coefficient of thermal expansion that is less than $50\times10^{-6}$/K or example, $15\times10^{-6}$/K-$25\times10^{-6}$/K.

The thermal dependency of the refractive index, measured as dn/dT (the temperature coefficient of the refractive index), is also preferably low. Thus, the glasses according to the invention preferably have a dn/dT value of less than $30\times10^{-6}$/K, for example, $5\times10^{-6}$/K-$30\times10^{-6}$/K.

According to an aspect of the invention, there is provided a glass composition based on sulfur compounded with germanium, arsenic and/or gallium, the glass composition comprising (based on mol %):

| Component | Mole % |
|---|---|
| S | 58.00-90.00 |
| Ga | 0-25.00 |
| As | 0-40.0 |
| Ge | 0-35.00 |
| $R^1$ (added in the form of $R^1Hal$) | 0-7.25 |
| $R^2$ (added in the form of $R^2Hal$) | 0-13.5 |
| $M^1$ (added in the form of $M^1Hal_2$) | 0-5 |
| $M^2$ (added in the form of $M^2Hal_2$) | 0-7.25 |
| Ln (added in the form of $LnHal_3$) | 0-4.00 |
| Sum of Ga, As, and Ge | 10.00-42.00 |
| Sum of $R^1$, $R^2$, $M^1$, $M^2$, and Ln | 0-16.00 |
| Sum of Hal | 0-16.00 | wherein
Hal=fluoride, chloride, bromide, and/or iodide,
$R^1$=Li, Na, K, Rb, and/or Cs,
$R^2$=Ag and/or Cu,
$M^1$=Mg, Ca, Sr, and/or Ba,
$M^2$=Zn, Cd, Hg, and/or Pb,
Ln=La, Ce, Pr, Nd, Pm, Sm Eu, Gd, Tb, Dy, Ho, Er, Tm, Ty, Lu, Y, and Sc.

According to a further aspect, the invention includes a glass composition, based on sulfur compounded with germanium, arsenic and/or gallium, comprising (based on mol %):

| Component | Mole % |
|---|---|
| S | 65.00-75.00 |
| Ga | 0-10.00 |
| As | 0-35.00 |
| Ge | 3.00-30.00 |
| $R^1$ (added in the form of $R^1Hal$) | 0-5 |
| $R^2$ (added in the form of $R^2Hal$) | 0-10 |
| $M^1$ (added in the form of $M^1Hal_2$) | 0-3 |
| $M^2$ (added in the form of $M^2Hal_2$) | 0-5 |

| Component | Mole % |
| --- | --- |
| Ln (added in the form of LnHal$_3$) | 0-3 |
| Sum of Ga, As, and Ge | 30.00-40.00 |
| Sum of R$^1$, R$^2$, M$^1$, M$^2$, and Ln | 0-10 |
| Sum of Hal | 0-10 |

According to another aspect of the invention, there is provided a glass composition based on selenium compounded with gallium, the glass composition comprising (based on mol %):

| Component | Mole % |
| --- | --- |
| Se | 30.00-68.00 |
| Ga | 5.00-30.00 |
| Ge | 0-25.00 |
| R$^1$ (added in the form of R$^1$Hal$^1$) | 0-25.00 |
| R$^2$ (added in the form of R$^2$Hal$^1$) | 0-25.00 |
| M$^1$ (added in the form of M$^1$Hal$^1{}_2$) | 0-12.50 |
| M$^2$ (added in the form of M$^2$Hal$^1{}_2$) | 0-20.00 |
| Ln (added in the form of LnHal$^1{}_3$) | 0-8 |
| Sum of Se, Ga, and Ge | 50.00-93.33 |
| Sum of R$^1$, R$^2$, M$^1$, M$^2$, and Ln | 1.67-25.00 |
| Sum of Hal$^1$ | 5.00-25.00 | wherein

Hal$^1$=chloride and/or bromide,

R$^1$=Li, Na, K, Rb, and/or Cs,

R$^2$=Ag and/or Cu,

M$^1$=Mg, Ca, Sr, and/or Ba,

M$^2$=Zn, Cd, Hg, and/or Pb, and

Ln=La, Ce, Pr, Nd, Pm, Sm Eu, Gd, Tb, Dy, Ho, Er, Tm, Ty, Lu, Y, and Sc.

According to a further aspect, there is provided a glass composition, based on selenium compounded with gallium, comprising (based on mol %):

| Component | Mole % |
| --- | --- |
| Se | 35.00-65.00 |
| Ga | 7.00-22.00 |
| Ge | 18.00-23.00 |
| R$^1$ (added in the form of R$^1$Hal$^1$) | 0-20 |
| R$^2$ (added in the form of R$^2$Hal$^1$) | 0-20.00 |
| M$^1$ (added in the form of M$^1$Hal$^1{}_2$) | 0-10 |
| M$^2$ (added in the form of M$^2$Hal$^1{}_2$) | 0-15.00 |
| Ln (added in the form of LnHal$^1{}_3$) | 0-5 |
| Sum of Se, Ga, and Ge | 55.00-85.00 |
| Sum of R$^1$, R$^2$, M$^1$, M$^2$, and Ln | 1.67-22.00 |
| Sum of Hal$^1$ | 7.5-22.00 |

With regards to the sulfur based compositions, the amount of sulfur is 58.00-90.00 mol %, preferably 58.00-75.00 mol %, based on the total moles (e.g., based on total moles of S, Ga, As, Ge, R$^1$, R$^2$, M$^1$, M$^2$, Ln and Hal when neither In nor Sb are present). According to another aspect, the sulfur based glass compositions according to the invention contain 65.00-75.00 mol % of sulfur, for example, 60.00-65.00 mol % of sulfur, or 70.00-75.00 mol % sulfur, or 65.00-70.00 mol % sulfur.

Also, in the sulfur based compositions the amount of gallium is 0-25.00 mol %, based on the total moles (e.g., based on total moles of S, Ga, As, Ge, R$^1$, R$^2$, M$^1$, M$^2$, Ln and Hal). According to another aspect, the sulfur based glass compositions according to the invention contains 0-20.00 mol % Ga, for example, 0-10.00 mol % Ga, 5.00-15.00 mol % Ga, or 5.00-10.00 mol % Ga, or 6 mol %, 7 mol %, 8 mol %, or 9 mol %.

According to another aspect, in the sulfur based glass compositions according to the invention a portion of the gallium can be replaced by indium, particularly in situations were a lower amount of visible transmission is acceptable. The presence of In tends to reduce visible transmission. However, the combined total amount of gallium and indium is still preferably 0-25 mol %, based on the total moles (e.g., based on total moles of S, Ga, In, As, Ge, R$^1$, R$^2$, M$^1$, M$^2$, Ln and Hal). For example, the sulfur based glass compositions according to the invention can contain 0-5 mol % In and 20-25 mol % Ga, or 0-12 mol % In and 0-12 mol % Ga, or 20-25 mol % In and 0-5 mol % Ga.

In the sulfur based compositions the amount of arsenic is 0-40.00 mol %, based on the total moles (e.g., based on total moles of S, Ga, As, Ge, R$^1$, R$^2$, M$^1$, M$^2$, Ln and Hal). According to another aspect, the sulfur based glass compositions according to the invention contain, for example, 0-10.00 mol % As, or 10.00-25.00 mol % As, or 25.00-35.00 mol % As, or 35.00-40.00 mol % As.

According to another aspect, in the sulfur based glass compositions according to the invention a portion of the arsenic can be replaced by antimony, particularly in situations were a lower amount of visible transmission is acceptable. The presence of Sb tends to reduce visible transmission. However, the combined total amount of arsenic and antimony is still preferably 0-40.00 mol %, based on the total moles (e.g., based on total moles of S, Ga, As, Sb, Ge, R$^1$, R$^2$, M$^1$, M$^2$, Ln and Hal). For example, the sulfur based glass compositions according to the invention can contain 0-10 mol % Sb and 0-30 mol % As, or 0-20 mol % Sb and 0-20 mol % As, or 0-30 mol % Sb and 0-10 mol % As.

In the sulfur based compositions the amount of germanium is 0-35.00 mol %, based on the total moles (e.g., based on total moles of S, Ga, As, Ge, R$^1$, R$^2$, M$^1$, M$^2$, Ln and Hal). According to another aspect, the sulfur based glass compositions according to the invention contain 0-25.00 mol % Ge, for example, 5.00-25.00 mol % Ge, or 10.00-20.00 mol % Ge, or 20.00-25.00 mol % Ge.

In the sulfur based compositions the total combined amount of Ga, As, and Ge is 10.00-42.00 mol %, based on the total moles (e.g., based on total moles of S, Ga, As, Ge, $R^1$, $R^2$, $M^1$, $M^2$, Ln and Hal). According to another aspect, the sulfur based glass compositions according to the invention contain, for example, a total combined amount of Ga, As, and Ge of 20.00-40.00 mol %, or 25.00-40.00 mol %, or 30.00-40.00 mol %.

In the sulfur based compositions the amount of Hal is 0-13.5 mol %, based on the total moles (e.g., based on total moles of S, Ga, As, Ge, $R^1$, $R^2$, $M^1$, $M^2$, Ln and Hal). According to another aspect, the sulfur based glass compositions according to the invention contain 0-10.00 mol % Hal, for example, 1.00-10.00 mol % Hal, or 2.00-9.00 mol % Hal, or 3.00-5.00 mol % Hal.

The selection of halide compounds can affect the critical cooling rate of the glass composition. In general, the halides $M^2Hal_2$($M^2$=Zn, Cd, or Pb) and $R^2Hal$($R^2$=Ag or Cu) produce glass at lower cooling rates and are, therefore, preferred, while glass made with the halides $R^1Hal$($R^1$=Li, Na, K, Rb, or Cs) and $M^1Hal_2$($M^1$=Mg, Ca, Sr, or Ba) tend to requires more rapid cooling. At a given cooling rate, a higher total halogen content may be achieved using $M^2Hal_2$ and $R^2Hal$ halides, as compared to $R^1Hal$ and $M^1Hal_2$.

The addition of chlorine is most efficacious in modifying the visible transmission and thereby the short wavelength dispersion, which are liked though the Kramers-Kronig relation. The addition of Br has a somewhat larger effect than Cl on increasing thermal expansion and thereby reducing dn/dT which is linked through the Lorenz-Lorentz relation. Br also has a slightly impact on increasing IR transmission but a lower impact on increasing visible/NIR transmission relative to Cl. The identity of the alkali elements is also impacts thermal expansion. Larger alkali ions (Cs) will generally tend to increase thermal expansion compared to smaller ions (Li). On the other hand, the identity of the alkali element will have very little effect on the transmission or dispersion.

With regards to the selenium based compositions, the amount of selenium is 30.00-68.00 mol %, based on the total moles (e.g., based on total moles of Se, Ga, Ge, $R^1$, $R^2$, $M^1$, $R^2$, $M^1$, $M^2$, Ln, and $Hal^1$ or the total moles of Se, Ga, In, Ge, $R^1$, $R^2$, $M^1$, $M^2$, Ln, and $Hal^1$). According to another aspect, the selenium based glass compositions according to the invention contain 30.00-65.00 mol % of selenium, for example, 30.00-60.00 mol % of selenium, or 30.00-55.00 mol % selenium, or 30.00-40.00 mol % selenium, or 40.00-55.00 mol % selenium.

In the selenium based compositions the amount of germanium is 0-25.00 mol %, based on the total moles (e.g., based on total moles of Se, Ga, Ge, $R^1$, $R^2$, $M^1$, $M^2$, Ln, and Hal). According to another aspect, the selenium based glass compositions according to the invention contain 15.00-25.00 mol % Ge, for example, 15.00-20.00 mol % Ge, or 20.00-25.00 mol % Ge, or 19.00-23.00 mol % Ge. It should be noted that the presence of germanium in the selenium based compositions is preferred as it tends to prevent phase separation. If germanium is not present, then it is desirable to use high amounts, e.g., of chlorides/bromides to prevent phase separation.

Also, in the selenium based compositions the amount of gallium is 5-30.00 mol %, based on the total moles (e.g., based on total moles of Se, Ga, Ge, $R^1$, $R^2$, $M^1$, $M^2$, Ln, and Hal). According to another aspect, the selenium based glass compositions according to the invention contains 5-22.00 mol % Ga for example, 5-20.00 mol % Ga, 5.00-15.00 mol % Ga, or 5.00-10.00 mol % Ga, or 6 mol %, 7 mol %, 8 mol %, or 9 mol %.

According to another aspect, in the selenium based glass compositions according to the invention a portion of the gallium can be replaced by indium, particularly in situations where a lower amount of visible transmission is acceptable. The presence of In tends to reduce visible transmission. However, the combined total amount of Gallium and Indium is still preferably 5-30.00 mol %, based on the total moles of Se, Ga, In, Ge, $R^1$, $R^2$, $M^1$, $M^2$, Ln, and $Hal^1$. For example, the selenium based glass compositions according to the invention can contain 0-10 mol % In and 20-30 mol % Ga, or 5-15 mol % In and 5-15 mol % Ga, or 20-30 mol % In and 0-10 mol % Ga.

In the selenium based compositions the total combined amount of Ga and Ge is preferably 20.00-40.00 mol %, based on the total moles of based on the total moles of Se, Ga, Ge, $R^1$, $R^2$, $M^1$, $M^2$, Ln, and $Hal^1$. According to another aspect, the selenium based glass compositions according to the invention contain, for example, a total combined amount of Ga, As, and Ge of 21.00-40.00 mol %, or 25.00-35.00 mol %, or 25.00-30.00 mol %.

In the selenium based compositions the amount of $Hal^1$ is 5-25 mol %, based on the total moles of Se, Ga, In, Ge, $R^1$, $R^2$, $M^1$, $M^2$, Ln, and $Hal^1$. According to another aspect, the selenium based glass compositions according to the invention contain 5-15.00 mol % $Hal^1$, for example, 5.00-10.00 mol % $Hal^1$, or 6.00-9.00 mol % $Hal^1$, or 7.00-9.00 mol % $Hal^1$.

As noted above, the selection of halide compounds can affect the cooling rate of the glass composition. In general, the halides $M^2Hal_2$($M^2$=Zn, Cd, Hg, or Pb) and $R^2Hal$ ($R^2$=Ag or Cu) produce glass at lower cooling rates and are, therefore, preferred, while glass made with the halides $R^1Hal$($R^1$=Li, Na, K, Rb, or Cs) and $M^1Hal_2$($M^1$=Mg, Ca, Sr, or Ba) tend to requires more rapid cooling. At a given cooling rate, a higher total halogen content may be achieved using $M^2Hal_2$ and $R^2Hal$ halides, as compared to $R^1Hal$ and $M^1Hal_2$.

As mentioned above, the addition of chlorine is most efficacious in modifying the visible transmission and thereby the short wavelength dispersion, which are liked though the Kramers-Kronig relation. The addition of Br has a somewhat larger effect on increasing thermal expansion and thereby do/dT which are linked through the Lorenz-Lorentz relation. Br also has a slightly higher impact on increasing transmission but its impact on visible transmission is weaker as compared to Cl. The identity of the alkali elements is also impacts thermal expansion. Larger alkali ions (Cs) will generally tend to increase thermal expansion compared to smaller ions (Li). On the other hand, the identity of the alkali element will have very little effect on the transmission or dispersion. However, Cs is preferred over Na or K when large amount of Hal are desired.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

As described above, optical materials for IR wavelengths suffer from thermally-induced changes in focal length in lenses due to thermal expansion and dn/dT. In an achromatic doublet lens, the dispersions combine to provide equal powers at 2 wavelengths. To athermalize a lens (i.e., to reduce thermal effects), the coefficient of thermal expansion (CTE) and dn/dT need to be balanced. Therefore, using the following equations:

$$\alpha(CTE) = \frac{1}{L}\frac{DL}{(DT)}, \beta = \frac{dn}{dt}, \text{ and}$$

$$\delta = \frac{\beta}{n-1} - \alpha(\text{thermal change in focal power}),$$

one can estimate the requirements for achieving an athermal and achromatic system.

For a doublet lens, the power, K, is equal to the powers of the individual lens, i.e., $K_1+K_2=K$ (doublet). For an achromatic lens, $K_1/V_1+K_2/V_2=0$ (i.e., $K_2=K_1V_2/V_1$) V represents the Abbe No. For athermalization, $K_1\delta_1+K_2\delta_2=K\alpha_h$, where $\alpha_h$ is the thermal expansion coefficient of the housing material (i.e., the housing holding the lens). Combining the equations results in $\delta_2=[V_1(\alpha_h-\delta_1)/V_2]+\alpha_h$. Thus, the corrective lens of the doublet preferably satisfies this criterion.

Figure 1:
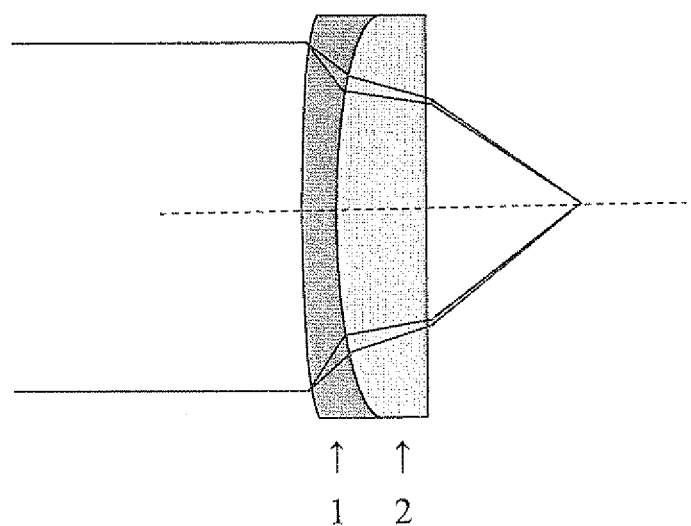
FIG. 1 illustrates a doublet lens system containing a corrective lens in accordance with the invention.

FIG. 1 illustrates a doublet lens wherein an infrared lens 1 is paired with a corrective lens 2 made a chalcogenide glass composition according to the invention. The IR lens 1 and corrective lens 2 are preferably fused together, although they can also be separated by a small air space. Lens 1 can be made from any of the commonly used material for IR lenses, for example, ZnSe, ZnS, Ge, GaAs, BaF$_2$, and chalcogenide glasses, preferably ZnSe or ZnS. Preferably, a ZnSe IR lens is paired with a corrective lens made from a selenium based glass composition according to the invention, as these glasses will have similar transmission properties. For similar reasons, a ZnS IR lens is preferably paired with a corrective lens made form a sulfur based glass composition according to the invention.

As shown in FIG. 1, light passing through the IR lens 1 is subjected to dispersion due to the variance in refractive index, which causes the focal length to be shorter at shorter wavelengths. This light then passes through corrective lens 2 which corrects the light transmission by preferentially increasing the focal length relative to that created by the first lens at shorter wavelengths, thereby counteracting the effects of the first lens.

Figure 2:
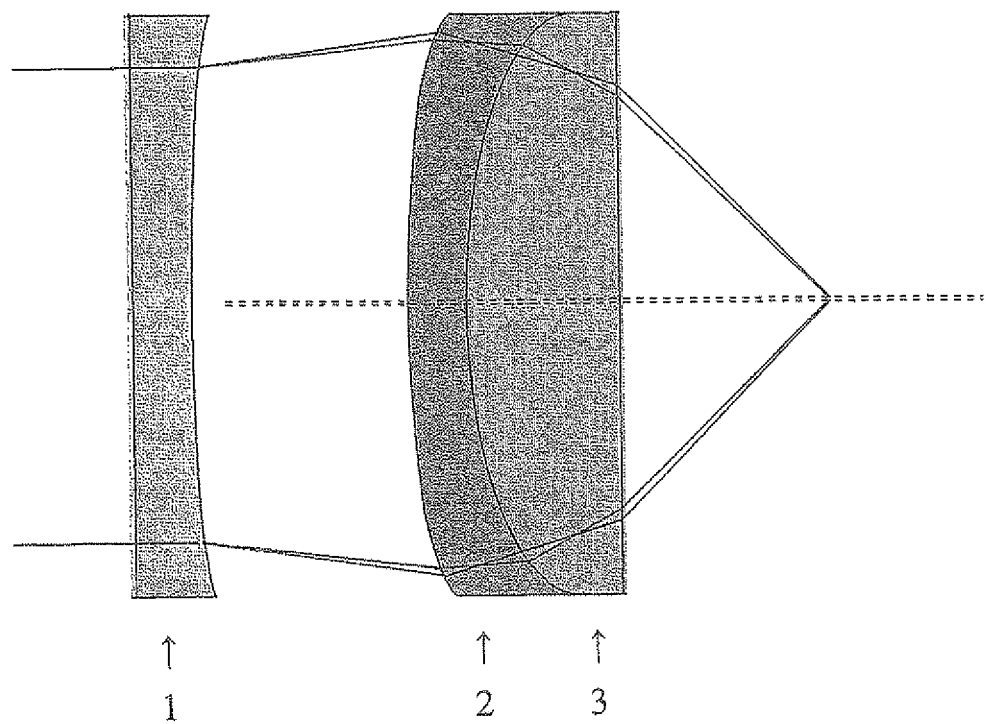
FIG. 2 illustrates a triplet lens system containing a corrective lens made from two glasses in accordance with the invention.

FIG. 2 illustrates another embodiment according to the invention wherein a pair of lenses may be added to the system in order to leave the focal length at a single wavelength unaffected but to change either the dispersive or thermal behavior of the system in order to counteract the effects of the main focusing element. This is most efficacious in correcting problems in existing systems. For instance, thermal defocus in Germanium-based optical systems may be corrected by inserting a lens pair with an infinite focal length at room temperature, but which becomes negative at elevated temperatures or positive at decreased temperatures, thereby correcting the errors introduced by the germanium element.

Thus, an existing lens may be corrected using two lenses (one positive and one negative) which give a total power of 0 (afocal) at the center wavelength, but which have different V and δ to correct deficiencies of the primary lens without change overall focal length. Thus, the powers of the two corrective lenses are to cancel each other out, i.e., $K_1+K_2+K_3=K_1$ when $K_2=-K_3$ ($K_1$ is the power of the existing lens and $K_2$ and $K_3$ are the powers of the doublet lens). Going through the process of achromatizing and althermalizing using the equations described above, the 2 glasses of the doublet lens preferably satisfy the following (with a preference for small $K_2$): $[V_2V_3/V_1(V_3-V_2)=(\alpha_h-\delta_1)/(\delta_2.\delta_3)]$.

Thus, in FIG. 2 an infrared lens 1 is used in combination with a doublet lens containing lens elements 2 and lens 3, one having a negative power and the other having a positive power. The negative power lens element should have higher dispersion (smaller V) and higher δ than positive lens element. Lens 2 and lens 3 are preferably fused. Lens 1 can be made from any of the commonly used material for IR lenses, for example, ZnSe, ZnS, Ge, GaAs, BaF$_2$, and known chalcogenide glasses, preferably ZnSe or ZnS. At least one of lens 2 and lens is made from a chalcogenide glass composition according to the invention. The other lens can be made from a chalcogenide glass composition according to the invention or from any of the commonly used material for IR lenses, such as ZnSe, ZnS, Ge, GaAs, BaF$_2$, and known chalcogenide glasses. For example, lens 1 can be of ZnS, lens 2 can be from a chalcogenide glass composition according to the invention, and lens 3 can be made of ZnSe.

EXAMPLES

The glasses of this invention can be fully conventionally prepared by mixing the appropriate amounts of each constituent to form a batch composition which is then charged into a fused silica ampoule and melted by radiative heating, e.g., from 600° C. to as much as 1050° C., depending on the chosen composition typically 2 to 4 hours, again depending on composition and melt viscosity while rocking the melt in order to cause agitation and increase homogeneity. The glass within its ampoule is then typically removed from the furnace and allowed to cool by convection in room temperature air to a temperature near its glass transition temperature. The ampoule and glass sample are then placed into a heated oven at the glass transition temperature plus about 20° C. for about 2 hours followed by cooling at about 30° C./hour. These procedures are followed in the examples below.

As noted above, the examples of this application are melted in a fused silica ampoule. It is well known that chalcogenide compounds, particularly those of S with Ge or Ga possess high vapor pressures near the melt temperature. The pressure evolved during melting may exceed the burst pressure of the silica vessel, leading to rupture of the ampoule. Also, the thermal expansion of these glasses is relatively large compared to that of the ampoule. Under the conditions of wetting of the glass to the interior of the ampoule, the stress induced during quenching may cause a rupture ampoule and/or glass ingot within. The temperatures and heating rates during the melting and quenching operations must therefore be chosen judiciously in order to prevent rupture, depending on the design of the ampoule and dimensions and composition of the glass ingot. The need to control these factors while still providing sufficiently high melting temperatures and cooling rates while quenching combine to limit the dimensions of the ampoule and glass sample which may be prepared.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

Tables 1A, 1B, 1C, 1D, 1E, and 1F list examples of the glass composition according to the invention. Tables 1A-1D list examples of the sulfur based glass composition and Tables 1E and 1F lists examples of the selenium based glass composition.

TABLE 1A

Examples of Sulfur Based Glass Compositions (mol %) According to the Invention

| Component Content (mol %) | 1 | 2 | 3 | 4 | 5 | 6 | 7 |
|---|---|---|---|---|---|---|---|
| S | 60 | 60 | 60 | 65 | 58 | 65 | 70 |
| Ge |  | 5 | 10 | 10 | 20 | 25 | 23 |
| Ga |  |  |  |  |  |  |  |
| As | 40 | 35 | 30 | 25 | 12 | 10 | 7 |
| Total | 100 | 100 | 100 | 100 | 100 | 100 | 100 |

TABLE 1B

Further Examples of Sulfur Based Glass Compositions (mol %) According to the Invention

| Component Content (mol %) | 8 | 9 | 10 | 11 |
|---|---|---|---|---|
| S | 70 | 70 | 75 | 70 |
| Ge | 25 | 20 | 20 | 23 |
| Ga | 5 | 10 | 5 | 7 |
| As |  |  |  |  |
| Total | 100 | 100 | 100 | 100 |

TABLE 1C

Examples of Selenium Based Glass Compositions (mol %) According to the Invention

| Component Content (mol %) | 12 | 13 | 14 | 15 | 16 | 17 | 18 | 19 |
|---|---|---|---|---|---|---|---|---|
| Se | 37 | 37 | 52.5 | 54.2 | 55.6 | 52.5 | 54.2 | 55.6 |
| Ga | 21 | 21 | 9.5 | 8.3 | 7.4 | 9.5 | 8.3 | 7.4 |
| Ge |  |  | 19 | 20.9 | 22.2 | 19 | 20.9 | 22.2 |
| Br |  | 21 |  |  |  | 9.5 | 8.3 | 7.4 |
| Cl | 21 |  | 9.5 | 8.3 | 7.4 |  |  |  |
| Cs, Na, K, Ag | 21 (Cs) | 21 (Cs) | 9.5 (Na) | 8.3 (Na) | 7.4 (Na) | 9.5 (Na) | 8.3 (Na) | 7.4 (Na) |
| Total | 100 | 100 | 100 | 100 | 100 | 100 | 100 | 100 |

TABLE 1D

Examples of Selenium Based Glass Compositions (mol %) According to the Invention

| Component Content (mol %) | 20 | 21 | 22 | 23 | 24 | 25 | 26 | 27 |
|---|---|---|---|---|---|---|---|---|
| Se | 37 | 37 | 52.5 | 54.2 | 55.6 | 52.5 | 54.2 | 55.6 |
| Ga | 21 | 21 | 9.5 | 8.3 | 7.4 | 9.5 | 8.3 | 7.4 |
| Ge |  |  | 19 | 20.9 | 22.2 | 19 | 20.9 | 22.2 |
| Br |  | 21 |  |  |  | 9.5 | 8.3 | 7.4 |
| Cl | 21 |  | 9.5 | 8.3 | 7.4 |  |  |  |
| Cs, Na, K, Ag | 21 (Ag) | 21 (Ag) | 9.5 (K) | 8.3 (K) | 7.4 (K) | 9.5 (K) | 8.3 (K) | 7.4 (K) |
| Total | 100 | 100 | 100 | 100 | 100 | 100 | 100 | 100 |

TABLE 1E

Further Examples of Selenium Based Glass Compositions (mol %) According to the Invention

| Component Content (mol %) | 28 | 29 | 30 | 31 | 32 | 33 |
|---|---|---|---|---|---|---|
| Se | 55 | 65.5 | 57.7 | 55 | 65.5 | 57.7 |
| Ga | 10 | 8.7 | 7.7 | 10 | 8.7 | 7.7 |
| Ge | 20 | 21.8 | 23 | 20 | 21.8 |  |
| Br |  |  |  | 10 | 8.7 | 7.7 |
| Cl | 10 | 8.7 | 7.7 |  |  |  |
| Zn | 5 | 4.3 | 3.9 | 5 | 4.3 | 3.9 |
| Total | 100 | 100 | 100 | 100 | 100 | 100 |

TABLE 1F

Further Examples of Selenium Based Glass Compositions (mol %) According to the Invention

| Component Content (mol %) | 34 | 35 | 36 | 37 | 38 | 39 |
|---|---|---|---|---|---|---|
| Se | 55 | 65.5 | 57.7 | 55 | 65.5 | 57.7 |
| Ga | 10 | 8.7 | 7.7 | 10 | 8.7 | 7.7 |
| Ge | 20 | 21.8 | 23 | 20 | 21.8 |  |
| Br |  |  |  | 10 | 8.7 | 7.7 |
| Cl | 10 | 8.7 | 7.7 |  |  |  |
| Pb | 5 | 4.3 | 3.9 | 5 | 4.3 | 3.9 |
| Total | 100 | 100 | 100 | 100 | 100 | 100 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The entire disclosure[s] of all applications, patents and publications, cited herein, are incorporated by reference herein.

The invention claimed is:

1. In a night vision device comprising an infrared optical element, an image enhancer or intensifier, and a phosphor or fluorescent display, the improvement wherein said infrared optical element comprises a lens made from a chalcogenide glass composition consisting essentially of (based on mol % of total moles):

| Component | Mole % |
|---|---|
| S | 70.00-75.00 |
| Ga | 5.00-10.00 |
| Ge | 20.00-25.00 |
| $R^1$ | 0.00-5.00 |
| (added in the form of $R^1$Hal) | | wherein
Hal=fluoride, chloride, bromide, and/or iodide,
$R^1$=Li, Na, K, Rb, and/or Cs, and
wherein a portion of the gallium can be replaced by indium.

2. A night vision device according to claim 1, wherein said composition contains 5.00-7.00 mol % Ga.

3. A night vision device according to claim 1, wherein a portion of the gallium is replaced by indium in said composition.

4. A night vision device according to claim 1, wherein said composition contains 23.00-25.00 mol % Ge.

5. A night vision device according to claim 1, wherein said composition does not contain arsenic.

6. A night vision device according to claim 1, wherein said composition consists of (based on mol % of total moles):

| | |
|---|---|
| S | 70.00-75.00 |
| Ga | 5.00-10.00 |
| Ge | 20.00-25.00 |
| $R^1$ | 0.00-5.00 |
| (added in the form of $R^1$Hal) | | wherein
Hal=fluoride, chloride, bromide, and/or iodide,
$R^1$=Li, Na, K, Rb, and/or Cs, and
a portion of the gallium can be replaced by indium.

7. In an infrared or thermal imaging system comprising an infrared optical element, a plurality of thermal sensors for detecting the infrared light and converting it into electrical signals, and a signal-processing unit for converting the electrical signals into a visual image, the improvement wherein said infrared optical element comprises a lens made from a chalcogenide glass composition consisting essentially of (based on mol % of total moles):

| Component | Mole % |
|---|---|
| S | 70.00-75.00 |
| Ga | 5.00-10.00 |
| Ge | 20.00-25.00 |
| $R^1$ | 0.00-5.00 |
| (added in the form of $R^1$Hal) | | wherein
Hal=fluoride, chloride, bromide, and/or iodide,
$R^1$=Li, Na, K, Rb, and/or Cs, and
wherein a portion of the gallium can be replaced by indium.

8. An infrared or thermal imaging system according to claim 7, wherein said composition contains 5.00-7.00 mol % Ga.

9. An infrared or thermal imaging system according to claim 7, wherein a portion of the gallium is replaced by indium in said composition.

10. An infrared or thermal imaging system according to claim 7, wherein said composition contains 23.00-25.00 mol % Ge.

11. An infrared or thermal imaging system according to claim 7, wherein said composition does not contain arsenic.

12. An infrared or thermal imaging system according to claim 7, wherein said composition consists of (based on mol % of total moles):

| | |
|---|---|
| S | 70.00-75.00 |
| Ga | 5.00-10.00 |
| Ge | 20.00-25.00 |
| $R^1$ | |
| (added in the form of $R^1$Hal) | 0.00-5.00 | wherein
Hal=fluoride, chloride, bromide, and/or iodide,
$R^1$=Li, Na, K, Rb, and/or Cs, and
a portion of the gallium can be replaced by indium.

13. A doublet lens comprising an infrared lens paired with a corrective lens wherein said infrared lens is made of ZnSe, ZnS, Ge, GaAs, BaF$_2$, or chalcogenide glass, and said corrective lens is made from a chalcogenide glass composition consisting essentially of (based on mol % of total moles):

| Component | Mole % |
|---|---|
| S | 70.00-75.00 |
| Ga | 5.00-10.00 |
| Ge | 20.00-25.00 |
| $R^1$ | 0.00-5.00 |
| (added in the form of $R^1$Hal) | | wherein
Hal=fluoride, chloride, bromide, and/or iodide,
$R^1$=Li, Na, K, Rb, and/or Cs, and
wherein a portion of the gallium can be replaced by indium.

14. A doublet lens according to claim 13, wherein said composition contains 5.00-7.00 mol % Ga.

15. A doublet lens according to claim 13, wherein a portion of the gallium is replaced by indium in said composition.

16. A doublet lens according to claim 13, wherein said composition contains 23.00-25.00 mol % Ge.

17. A doublet lens according to claim 13, wherein said composition does not contain arsenic.

18. A doublet lens according to claim 13, wherein said composition consists of (based on mol % of total moles):

| | |
|---|---|
| S | 70.00-75.00 |
| Ga | 5.00-10.00 |
| Ge | 20.00-25.00 |
| $R^1$ | |
| (added in the form of $R^1$Hal) | 0.00-5.00 | wherein
Hal=fluoride, chloride, bromide, and/or iodide,
$R^1$=Li, Na, K, Rb, and/or Cs, and
a portion of the gallium can be replaced by indium.

19. An infrared lens system comprising a first infrared lens and a focal corrector doublet lens comprising a pair of corrective lenses, wherein said first infrared lens is made of ZnSe, ZnS, Ge, GaAs, BaF$_2$, or chalcogenide glass, one of said pair of corrective lenses has a positive power and the other has a negative power, and at least one of said pair of corrective lens is made from a chalcogenide glass composition consisting essentially of (based on mol % of total moles):

| Component | Mole % |
| --- | --- |
| S | 70.00-75.00 |
| Ga | 5.00-10.00 |
| Ge | 20.00-25.00 |
| $R^1$ | 0.00-5.00 |
| (added in the form of $R^1$Hal) | | wherein
Hal=fluoride, chloride, bromide, and/or iodide,
$R^1$=Li, Na, K, Rb, and/or Cs, and
wherein a portion of the gallium can be replaced by indium.

20. An infrared lens system according to claim 19, wherein said composition contains 5.00-7.00 mol % Ga.

21. An infrared lens system according to claim 19, wherein a portion of the gallium is replaced by indium in said composition.

22. An infrared lens system according to claim 19, wherein said composition contains 23.00-25.00 mol % Ge.

23. An infrared lens system according to claim 19, wherein said composition does not contain arsenic.

24. An infrared lens system according to claim 19, wherein said composition consists of (based on mol % of total moles):

| | |
| --- | --- |
| S | 70.00-75.00 |
| Ga | 5.00-10.00 |
| Ge | 20.00-25.00 |
| $R^1$ | |
| (added in the form of $R^1$Hal) | 0.00-5.00 | wherein
Hal=fluoride, chloride, bromide, and/or iodide,
$R^1$=Li, Na, K, Rb, and/or Cs, and
a portion of the gallium can be replaced by indium.

25. A chalcogenide glass comprising (based on mol % of total moles):

| Component | Mole % |
| --- | --- |
| S | 58.00-90.00 |
| Ga | 0-25.00 |
| As | 0-40.0 |
| Ge | 0-35.00 |
| $R^1$ | 0-7.25 |
| (added in the form of $R^1$Hal) | |
| $R^2$ | 0-13.5 |
| (added in the form of $R^2$Hal) | |
| $M^1$ | 0-5 |
| (added in the form of $M^1Hal_2$) | |
| $M^2$ | 0-7.25 |
| (added in the form of $M^2Hal_2$) | |
| Ln | 0-4 |
| (added in the form of $LnHal_3$) | |
| Sum of Ga, As, and Ge | 10.00-42.00 |
| Sum of $R^1$, $R^2$, $M^1$, $M^2$, and Ln | 0-16.00 |
| Sum of Hal | 0-16.00 | wherein
Hal=fluoride, chloride, bromide, and/or iodide,
$R^1$=Li, Na, K, Rb, and/or Cs,
$R^2$=Ag and/or Cu,
$M^1$=Mg, Ca, Sr, and/or Ba,
$M^2$=Zn, Cd, Hg, and/or Pb, and
Ln=La, Ce, Pr, Nd, Pm, Sm, Eu, Gd, Tb, Dy, Ho, Er, Tm, Ty, Lu, Y, and Sc;
wherein a portion of the gallium can be replaced by indium, and wherein a portion of the arsenic can be replaced by antimony.

26. In a night vision device comprising an infrared optical element, an image enhancer or intensifier, and a phosphor or fluorescent display, the improvement wherein said infrared optical element comprises a lens made from a chalcogenide glass composition according to claim 25.

27. In an infrared or thermal imaging system comprising an infrared optical element, a plurality of thermal sensors for detecting the infrared light and converting it into electrical signals, and a signal-processing unit for converting the electrical signals into a visual image, the improvement wherein said infrared optical element comprises a lens made from a chalcogenide glass composition according to claim 25.

28. A doublet lens comprising an infrared lens paired with a corrective lens wherein said infrared lens is made of ZnSe, ZnS, Ge, GaAs, $BaF_2$, or chalcogenide glass, and said corrective lens is made from a chalcogenide glass composition according to claim 25.

29. An infrared lens system comprising a first infrared lens and a focal corrector doublet lens comprising a pair of corrective lenses, wherein said first infrared lens is made of ZnSe, ZnS, Ge, GaAs, $BaF_2$, or chalcogenide glass, one of said pair of corrective lenses has a positive power and the other has a negative power, and at least one of said pair of corrective lens is made from a chalcogenide glass composition according to claim 25.

30. In a night vision device comprising an infrared optical element, an image enhancer or intensifier, and a phosphor or fluorescent display, the improvement wherein said infrared optical element comprises a lens made from A chalcogenide glass composition that transmits near-, mid-, and/or far-infrared light comprising sulfur compounded with germanium, arsenic and/or gallium, wherein all or a portion of gallium can be replaced by indium, and said composition optionally contains halides of silver, copper ($Cu^{+1}$), cadmium, zinc, lead ($Pb^{+2}$), alkali metals, alkaline earth metals, or rare earth metals,
wherein the total of the combined Ga and In content of said composition (based on mol % of total moles) 6.00-15.00 mol %, and the amount of Ge in said composition is 10.00-20.00 mol %.

31. In an infrared or thermal imaging system comprising an infrared optical element, a plurality of thermal sensors for detecting the infrared light and converting it into electrical signals, and a signal-processing unit for converting the electrical signals into a visual image, the improvement wherein said infrared optical element comprises a lens made from a chalcogenide glass composition that transmits near-, mid-, and/or far infrared light comprising sulfur compounded with germanium, arsenic and/or gallium, wherein all or a portion of gallium can be replaced by indium, and said composition optionally contains halides of silver, copper ($Cu^{+1}$), cadmium, zinc, lead ($Pb^{+2}$), alkali metals, alkaline earth metals, or rare earth metals,
wherein the total of the combined Ga and In content of said composition (based on mol % of total moles) 6.00-15.00 mol %, and the amount of Ge in said composition is 10.00-20.00 mol %.

32. A doublet lens comprising an infrared lens paired with a corrective lens wherein said infrared lens is made of ZnSe, ZnS, Ge, GaAs, $BaF_2$, or chalcogenide glass, and said corrective lens is made from a chalcogenide glass composition that transmits near-, mid-, and/or far infrared light comprising sulfur compounded with germanium, arsenic and/or gallium, wherein all or a portion of gallium can be replaced by indium, and said composition optionally contains halides of silver, copper ($Cu^{+1}$), cadmium, zinc, lead ($Pb^{+2}$), alkali metals, alkaline earth metals, or rare earth metals, wherein the total of the combined Ga and In content of said composition (based on mol % of total moles) 6.00-15.00 mol %, and the amount of Ge in said composition is 10.00-20.00 mol %.

33. An infrared lens system comprising a first infrared lens and a focal corrector doublet lens comprising a pair of corrective lenses, wherein said first infrared lens is made of ZnSe, ZnS, Ge, GaAs, $BaF_2$, or chalcogenide glass, one of said pair of corrective lenses has a positive power and the other has a negative power, and at least one of said pair of corrective lens is made from a chalcogenide glass composition that transmits near-, mid-, and/or far infrared light comprising sulfur compounded with germanium, arsenic and/or gallium, wherein all or a portion of gallium can be replaced by indium, and said composition optionally contains halides of silver, copper ($Cu^{+1}$), cadmium, zinc, lead ($Pb^{+2}$), alkali metals, alkaline earth metals, or rare earth metals, wherein the total of the combined Ga and In content of said composition (based on mol % of total moles) 6.00-15.00 mol %, and the amount of Ge in said composition is 10.00-20.00 mol %.

34. A chalcogenide glass composition consisting essentially of (based on mol % of total moles):

| Component | Mole % |
|---|---|
| S | 70.00-75.00 |
| Ga | 5.00-10.00 |
| Ge | 20.00-25.00 |
| $R^1$ (added in the form of $R^1Hal$) | 0.00-5.00 | wherein
Hal=fluoride, chloride, bromide, and/or iodide,
$R^1$=Li, Na, K, Rb, and/or Cs, and
wherein a portion of the gallium is replaced by indium.

* * * * *

UNITED STATES PATENT AND TRADEMARK OFFICE
CERTIFICATE OF CORRECTION

PATENT NO. : 10,294,143 B2
APPLICATION NO. : 14/937230
DATED : May 21, 2019
INVENTOR(S) : Nathan Aaron Carlie Page 1 of 1

It is certified that error appears in the above-identified patent and that said Letters Patent is hereby corrected as shown below:

In the Claims

Column 17, Line 61 (Claim 25) reads:
-- Sum of Hal    0 - 16.00 --
Should read:
-- Sum of Hal    9.00 - 16.00 --.

Signed and Sealed this
Seventh Day of April, 2020

Andrei Iancu
*Director of the United States Patent and Trademark Office*